United States Patent
Schuh et al.

(10) Patent No.: US 12,126,230 B2
(45) Date of Patent: Oct. 22, 2024

(54) METHOD FOR PRODUCING A MATERIAL LAYER WITH AT LEAST ONE RECESS

(71) Applicant: Siemens Aktiengesellschaft, Munich (DE)

(72) Inventors: Carsten Schuh, Baldham (DE); Thomas Soller, Bayern (DE); Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/038,149

(22) PCT Filed: Nov. 15, 2021

(86) PCT No.: PCT/EP2021/081690
§ 371 (c)(1),
(2) Date: May 22, 2023

(87) PCT Pub. No.: WO2022/112038
PCT Pub. Date: Jun. 2, 2022

(65) Prior Publication Data
US 2023/0402907 A1   Dec. 14, 2023

(30) Foreign Application Priority Data
Nov. 25, 2020   (EP) .................................. 20209854

(51) Int. Cl.
*H02K 15/12* (2006.01)
*B22F 3/10* (2006.01)
(Continued)

(52) U.S. Cl.
CPC .......... *H02K 15/12* (2013.01); *B22F 3/1021* (2013.01); *B22F 10/10* (2021.01); *B33Y 10/00* (2014.12);
(Continued)

(58) Field of Classification Search
CPC .......... H02K 15/12; H02K 1/276; H02K 1/28; H02K 15/03; B22F 3/1021; B22F 10/10; B22F 2301/35; B33Y 10/00; B33Y 80/00
See application file for complete search history.

(56) References Cited

U.S. PATENT DOCUMENTS

| | | |
|---|---|---|
| 11,451,121 B2 | 9/2022 | Seufert et al. |
| 11,482,893 B2 | 10/2022 | Vollmer |
| 2004/0153788 A1 | 8/2004 | Krietemeyer et al. |

FOREIGN PATENT DOCUMENTS

| | | | | |
|---|---|---|---|---|
| DE | 102011109129 A1 | * | 1/2013 | ............... H02K 1/02 |
| EP | 3 595 132 A1 | | 1/2020 | |

(Continued)

OTHER PUBLICATIONS

PCT International Search Report and Written Opinion of International Searching Authority mailed Feb. 25, 2022 corresponding to PCT International Application No. PCT/EP2021/081690 filed Nov. 15, 2021.

*Primary Examiner* — Rebecca Janssen
(74) *Attorney, Agent, or Firm* — Henry M. Feiereisen LLC

(57) ABSTRACT

In a method for producing a material layer with a recess, a first suspension containing a binder is applied through a first opening in a first template and a second suspension containing a binder and solid particles is applied through a second opening in a second template. The first opening in the first template is completely contained within the second opening in the second template such that the second suspension completely surrounds the first suspension to produce a green body. The green body containing the first and second suspensions is sintered such that the first suspension is evaporated to provide the recess and permanent cohesion of the solid particles in the second suspension is achieved.

16 Claims, 3 Drawing Sheets

(51) Int. Cl.
  *B22F 10/10* (2021.01)
  *B33Y 10/00* (2015.01)
  *B33Y 80/00* (2015.01)
  *H02K 1/276* (2022.01)
  *H02K 1/28* (2006.01)
  *H02K 15/03* (2006.01)

(52) U.S. Cl.
  CPC .............. *B33Y 80/00* (2014.12); *H02K 1/276* (2013.01); *H02K 1/28* (2013.01); *H02K 15/03* (2013.01); *B22F 2301/35* (2013.01)

(56) References Cited

FOREIGN PATENT DOCUMENTS

| | | |
|---|---|---|
| EP | 3 595 135 A1 | 1/2020 |
| EP | 3 595 148 A1 | 1/2020 |
| EP | 3 596 136 A1 | 1/2020 |
| EP | 3 725 435 A1 | 10/2020 |
| JP | H08157910 A | 6/1996 |
| JP | 2008199831 A | 8/2008 |
| JP | 2016032023 A | 3/2016 |
| WO | WO 2020/011821 A1 | 1/2020 |

\* cited by examiner

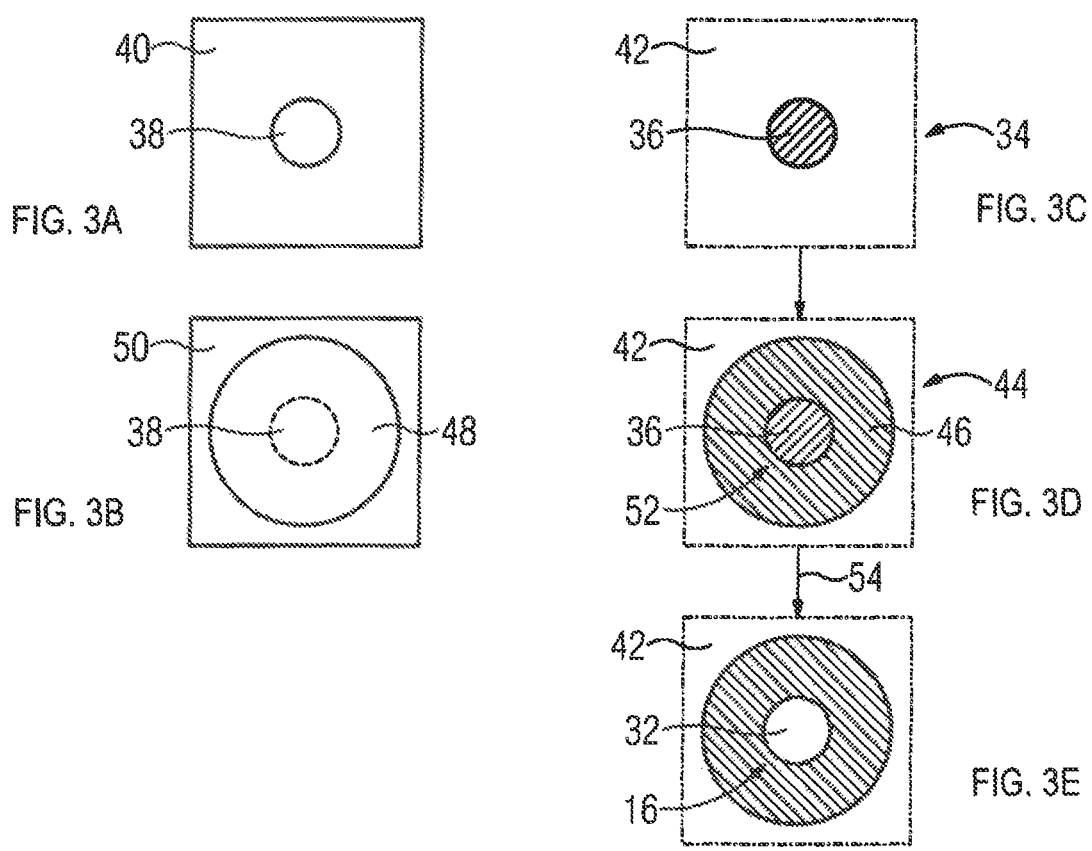
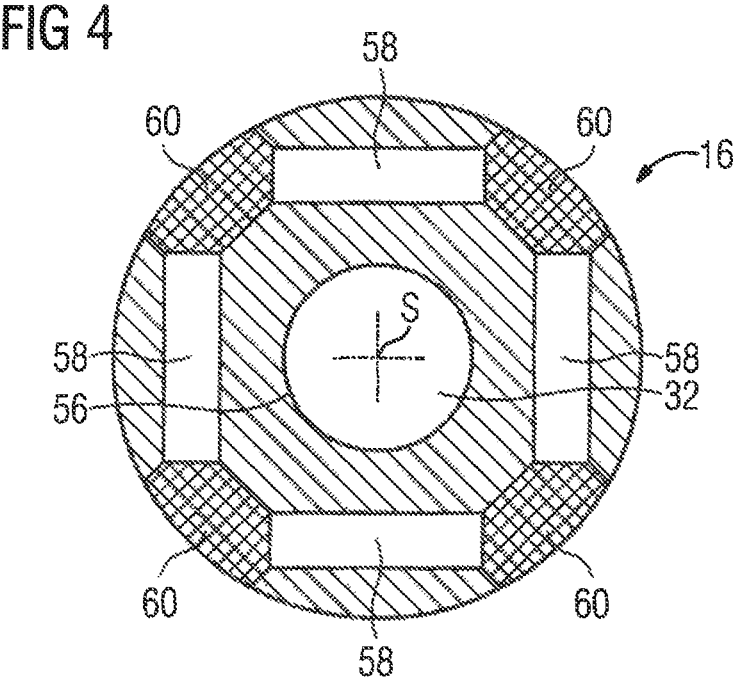

METHOD FOR PRODUCING A MATERIAL LAYER WITH AT LEAST ONE RECESS

CROSS-REFERENCES TO RELATED APPLICATIONS

This application is the U.S. National Stage of International Application No. PCT/EP2021/081690, filed Nov. 15, 2021, which designated the United States and has been published as International Publication No. WO 2022/112038 A1 and which claims the priority of European Patent Application, Serial No. 20209854.7, filed Nov. 25, 2020, pursuant to 35 U.S.C. 119(a)-(d).

BACKGROUND OF THE INVENTION

The invention relates to a method for producing a material layer with at least one recess from a green body.

The invention further relates to a method for producing a material layer structure for a rotor or a stator of a rotating electrical machine.

In rotating electrical machines, it is usual for laminated cores made of stacked electrical sheets to be used to suppress the propagation of eddy currents. Such rotating electrical machines are, for example, motors and generators. The electrical sheets, which, for example, contain a soft magnetic material, in particular iron, are usually cut or punched out of large rolled sheets. The sheets are then packaged to form a laminated core. At present, it is not possible to produce sheets on an industrial scale that have a layer thickness of less than 100 µm using conventional production methods of this kind. In addition, waste is produced when the sheets are cut or punched out of the large sheets.

Published unexamined patent application WO 2020/011821 A1 describes a material layer for a rotor of a dynamoelectric rotary machine with a rotational direction about a rotational axis arranged in a layer center of the material layer, wherein the material layer has a material recess arranged substantially in the layer center, wherein the material layer has a first region, wherein the first region has a first material with a first degree of strength, wherein the material layer has a substantially annular second region arranged concentrically to the layer center, wherein the second region has a second material with a second degree of strength higher than the first degree of strength, wherein the first material and the second material are connected with a material bond. The invention further relates to a material layer structure and to a method for producing a material layer.

Published unexamined patent application EP 3 725 435 A1 describes a production method in which a first green body is additively produced from a first material and the first green body is thermally pretreated by means of a first thermal process. A second green body is additively produced from a second material which differs from the first material. The thermally pretreated first green body and the second green body are treated together using a second thermal process in order to obtain the metal object.

Published unexamined patent application EP 3 595 148 A1 describes a method for producing a material layer with a layer thickness of between 0.5 and 500 µm with the steps: applying a suspension with at least one binder and solid particles through a template onto a base area for obtaining a green body, driving the binder out of the green body, in particular by means of debinding, creating a permanent cohesion of the solid particles by heating and/or by means of compaction, in particular by means of sintering.

Published unexamined patent application DE 10 2011 109 129 A1 describes an electrical energy converter with a stator and a rotor and/or with electric coils. The rotor and/or the stator and/or at least one electric coil are embodied as a three-dimensional monolithic element and made of electrically conductive, magnetically conductive, magnetically non-conductive, electrically non-conductive, magnetic, and/or magnetizable materials sintered to one another.

Printing at least one opening in the material layer requires a complex structured template, which is, for example, embodied as a screen. Such templates are expensive and complex to produce.

Therefore, the invention is based on the object of providing a method for producing a material layer with at least one void which is more cost-effective than the prior art. Throughout the specification and the claims, the term "void" will be used synonymously and interchangeably with "opening" or "hole".

SUMMARY OF THE INVENTION

The object is achieved according to the invention by a method for producing a material layer with at least one recess from a green body comprising the steps: applying a first suspension containing at least one binder through a first opening in a first template, applying a second suspension containing a binder and solid particles made of a second material through a second opening in a second template, wherein the first opening in the first template is completely contained within the second opening in the second template such that the second suspension completely surrounds the first suspension in the surface, sintering the green body containing the suspensions, wherein the first suspension is evaporated by means of the sintering process in order to provide the recess and permanent cohesion of the solid particles in the second suspension is achieved.

Moreover, the object according to the invention is achieved by a method for producing a material layer structure for a rotor or a stator of a rotating electrical machine comprising producing material layers, wherein at least one of the material layers is produced according to the above-described method and wherein the material layers are arranged one on top of the other.

The advantages and preferred embodiments set forth below with respect to the method for producing the material layer can be applied mutatis mutandis to the method for producing the material layer structure.

The invention is based on the concept of producing a material layer with at least one recess, which can, for example, be used in a laminated core for a rotating electrical machine, by means of an improved screen printing method with inexpensive and simple templates. Screen printing is performed with at least two templates each of which has an opening for applying a suspension for the material layer. First, a first suspension containing at least one binder is applied. The first suspension acts as a place holder material and contains, for example, binder polymers, in particular organic binder polymers. The first suspension optionally additionally contains solid particles made of a first material produced, for example, from organic polymers, which can be split at low temperature, for example 100° ° C. to 250° C., and thus can be evaporated. Alternatively, the first material of the first suspension is produced from an at least poorly sintering material, for example graphite powder, yttrium oxide, AlN, YAG or magnesium oxide, wherein the at least poorly sintering material can be evaporated by driving out the binder since no permanent cohesion of the at least poorly sintering solid particles can be formed. In a further step, a second suspension containing a binder and solid particles made of a second material is applied. The solid particles in the second suspension produced from the second material contain, for example, a ferromagnetic material, in particular iron or a magnetic iron alloy.

The first suspension is applied through a first opening in the first template, while the second suspension is applied through a second opening in the second template. The first opening in the first template is completely contained within the second opening in the second template such that the second suspension completely surrounds the first suspension. The fact that the first opening in the first template is completely contained within the second opening in the second template means that the first opening in the surface lies completely within the second opening. In particular, the respective template has a single opening for each material layer to be printed. A plurality of, in particular identical, material layers can be printed simultaneously on a base area each with a template which in each case has a plurality of, in particular identical, openings.

In a further step, the green body containing the suspensions is sintered, wherein the first suspension is evaporated by means of the sintering process and permanent cohesion of the solid particles in the second suspension is achieved. In this context, sintering in particular includes debinding to drive out the binder and possibly further volatile components of the first suspension followed by the actual sintering process. Debinding takes place, for example, at a temperature of between 300° C. and 600° C., while the actual sintering process takes place, for example, at a temperature of 700° C. to 1350° C.

Such a printing method enables the use of templates that are easy to produce and therefore inexpensive. The addition of further templates enables material layers made of a plurality of materials to be produced easily and inexpensively.

A further embodiment provides that the green body is dried, in particular immediately, after the application of the first suspension and/or after the application of the second suspension by the application of heat. Drying takes place, for example, by means of a heat lamp. For example, a brief drying step, lasting, for example, up to 60 s, takes place in each case between individual printing steps, while a longer drying step, lasting, for example, up to 60 min, takes place after the application of the suspensions. In particular, such drying times fix the freshly applied suspension and prevent smearing during a subsequent printing step, while the final longer drying step drives out any remaining solvent, for example.

A further embodiment provides that the first template has a substantially circular opening, wherein during sintering, evaporation of the first suspension provides a substantially circular recess in the material layer. Such a substantially circular opening is, for example, suitable for accommodating a shaft. Producing the opening by means of an evaporating suspension enables a high degree of accuracy and thus an exact fit, for example when accommodating a shaft.

A further embodiment provides that the second suspension is applied through the second template more thickly than the first suspension is applied through the first template. In particular, the height of the templates increases successively, for example in the range of from 1% to 10%, in particular in the range of from 1% to 5%, from partial print to partial print, in order to prevent a pre-existing print image from shearing-off from the base area.

A further embodiment provides that, prior to sintering, part of the suspensions is ablated, in particular parallel to a flat base area, on which the green body rests. For example, an upper region of the green body is removed by an ablative method. An upper region is, for example, up to 20%, in particular up to 50% of the total thickness of the green body. The ablative method is, for example, realized by means of hot wire cutting, also called thermal sawing, dry grinding, vibration cutting, also called vibratomy, or freeze cutting. Alternatively, the ablation takes place by means of heated stepped "doctor blades" or by means of etching followed by stripping. The, in particular parallel, ablation enables a very low layer thickness to be achieved.

A further embodiment provides that the second material contains a magnetic metallic material, in particular magnetic iron or a magnetic iron alloy. Experience has shown that such materials are particularly advantageous, in particular for sintering.

A further embodiment provides that the method comprises the following further steps: reapplying the first suspension after the application of the second suspension through a third opening in a third template, wherein the second opening in the second template is at least partially contained within the third opening in the third template such that the first suspension applied by means of the third template at least partially surrounds the second suspension applied by means of the second template, reapplying the second suspension through a fifth opening in a fifth template, wherein the third opening in the third template is at least partially contained within the fifth opening in the fifth template such that the second suspension applied by means of the fifth template at least partially surrounds the first suspension applied by means of the third template. Such a printing method enables the use of templates that are simple to produce and therefore inexpensive.

A further embodiment provides that the third template is embodied such that further recesses are formed arranged concentrically around the recess by evaporation of the first suspension. Permanent magnets for operation as a synchronous machine or bars of a squirrel cage can, for example, be arranged in such further recesses. Such a printing method enables material layers for various rotor architectures to be produced in a flexible additive manner.

A further embodiment provides that the method comprises the following further steps: applying a third suspension containing a binder and solid particles made of a third material after the reapplication of the first suspension through a fourth opening in a fourth template, wherein the third material differs from the second material, wherein the fourth opening in the fourth template is at least partially contained within the third opening in the third template such that the third suspension applied by means of the fourth template at least partially surrounds the first suspension applied by means of the third template, sintering the green body containing the suspensions, wherein, by means of the sintering process, permanent cohesion of the solid particles in the second suspension and the third suspension is achieved and regions with solid particles in the second suspension and adjacent regions with solid particles in the third suspension are connected with a material bond. For example, the second and third material are embodied as metallic materials which differ in terms of their electrical and/or thermal conductivity and/or in terms of their magnetic properties. Such a material-bonded connection achieves high mechanical stability within the material layer.

The addition of the templates enables material layers made of a plurality of materials to be produced easily and inexpensively.

A further embodiment provides that the third material contains a non-magnetic metallic material, in particular non-magnetic iron or a non-magnetic iron alloy. For example, the third material contains austenite. In particular the third material is arranged in the material layer when used in a laminated rotor core in order to prevent a magnetic short circuit, for example between permanent magnets arranged in the further recesses. A material layer composed of a plurality of different materials is easy and inexpensive to produce with a method of this kind.

A further embodiment provides that a material layer is produced with a layer thickness of between 10 µm and 300 µm, in particular between 10 µm and 100 µm. Such a layer thickness achieves sufficient eddy current suppression, for example when used in a rotating electrical machine.

A further embodiment provides that an electrically insulating coating is applied to at least one side of the layer. Such an insulating coating is, for example, produced by means of anodization, i.e., by means of controlled oxidative conversion, wherein the insulating coating prevents current conduction from one material layer to another material layer.

A further embodiment provides that an electrically insulating lacquer is applied to at least one side of the layer. The lacquer, in particular baked lacquer, has good insulating properties and can be applied thinly such that a high stacking factor can be achieved.

BRIEF DESCRIPTION OF THE DRAWING

The following describes and explains the invention in more detail with reference to the exemplary embodiments represented in the figures.

The figures show.

DETAILED DESCRIPTION OF PREFERRED EMBODIMENTS

The exemplary embodiments explained in the following are preferred embodiments of the invention. In the exemplary embodiments, the described components of the embodiments each represent individual features of the invention to be considered independently of one another, which each also develop the invention independently of one another and are thus also to be considered as a component of the invention individually or in a combination other than that shown. Furthermore, the described embodiments can also be supplemented by further features of the above-described features of the invention.

The same reference symbols have the same meaning in the different figures.

Figure 1:
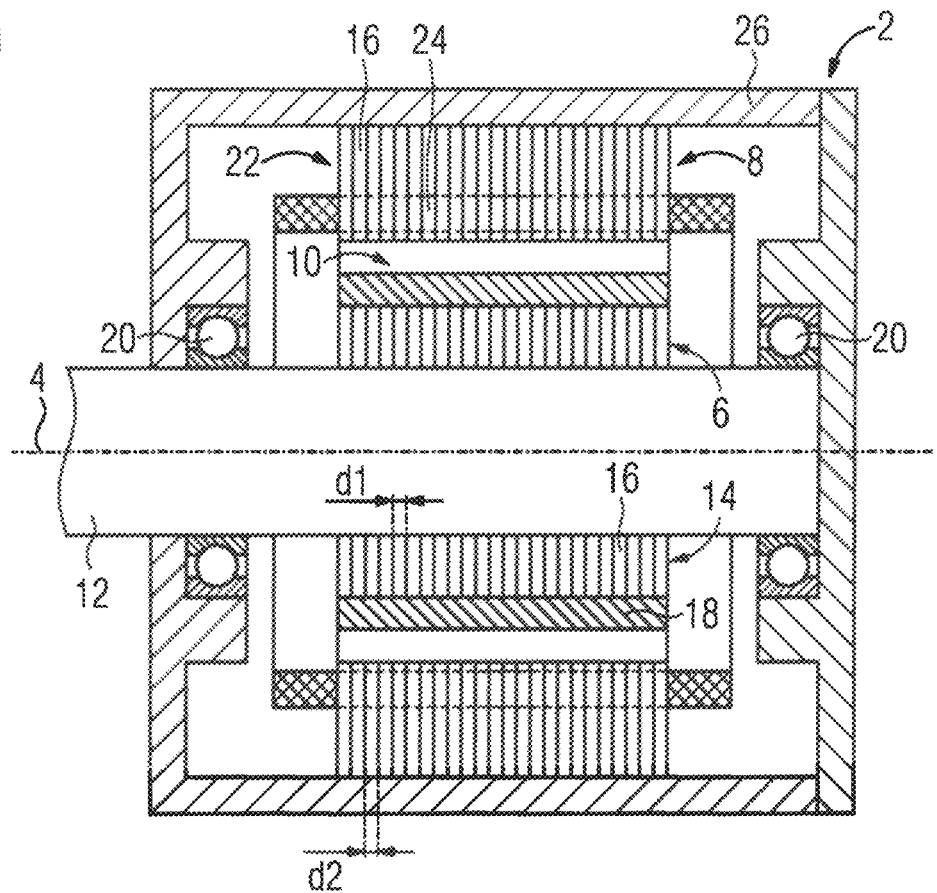
FIG. 1 a schematic cross-sectional representation of a rotating electrical machine, FIG. 2 a schematic representation of a first embodiment of a material layer, FIGS. 3A-3E a schematic representation of a first method for producing a material layer, FIG. 4 a schematic representation of a second embodiment of a material layer and FIG. 5 a schematic representation of a second method for producing a material layer.

FIG. 1 shows a schematic cross-sectional representation of a rotating electrical machine 2. The rotating electrical machine 2, which can be configured as a motor and/or as a generator, has a rotor 6 that can be rotated about an axis of rotation 4 and a stator 8, wherein, by way of example, the stator 8 is arranged radially outside the rotor 6. The axis of rotation 4 defines an axial direction, a radial direction and a circumferential direction. Between the rotor 6 and the stator 8, there is a fluid gap 10, in particular embodied as an air gap.

The rotor 6 has a shaft 12 and a laminated rotor core 14, wherein the laminated rotor core 14 is connected to the shaft 12 in a rotationally fixed manner. The laminated rotor core 14 comprises a plurality of stacked material layers 16 which are electrically insulated from one another and have a first layer thickness d1 in the range of from 10 µm to 300 µm, in particular 10 µm to 100 µm, which are produced from a ferromagnetic material, for example iron or an iron alloy. Moreover, the rotor 6 comprises multiple permanent magnets 18 connected to the laminated rotor core 14 for operation as a synchronous machine. In particular instead of the permanent magnets 18, the rotor 6 can have a squirrel cage for operation as an asynchronous machine or an excitation winding. The shaft 12 of the rotor 6 is arranged in a rotatable manner via bearings 20.

The stator 8 comprises a laminated stator core 22 in which a stator winding 24 is accommodated. The laminated stator core 22 comprises a plurality of stacked material layers 16 which are electrically insulated from one another and have a second layer thickness d2 in the range of from 10 µm to 300 µm, in particular 10 µm to 100 µm, which are produced from a ferromagnetic material, for example iron or an iron alloy. The rotor 6 and the stator 8 are housed in a closed housing 26.

Figure 2:
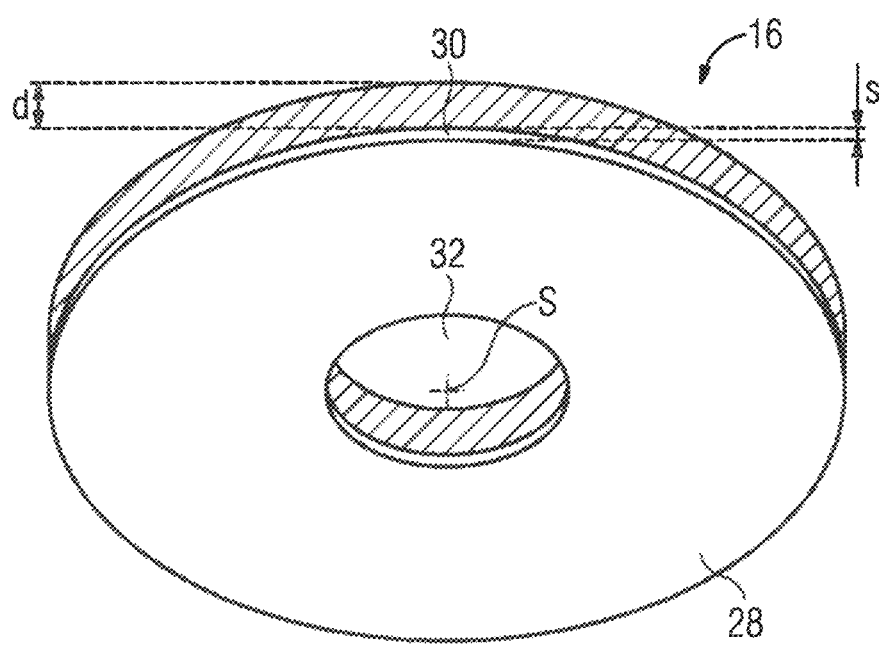

FIG. 2 shows a schematic representation of a first embodiment of a material layer 16 which has a layer thickness d in the range of from 10 µm to 300 µm, in particular 10 µm to 100 µm, and is produced by screen printing with subsequent sintering. The material layer 16 in FIG. 2 can be configured for a laminated rotor core 14 or a laminated stator core 22 and is produced from a ferromagnetic material, for example iron or an iron alloy, with an electrical conductivity of at least 8 mS/m. A layer side 28 of the material layer 16 has an electrically insulating coating 30 suitable for electrically insulating stacked material layers 16 from one another, for example when used in a laminated core 14, 22. The electrically insulating coating 30 is, for example, produced from an electrically insulating lacquer, in particular baked lacquer. Moreover, the electrically insulating coating 30 has a maximum layer thickness s of 1 µm. Furthermore, the material layer 16 has a substantially circular recess 32 in a center of gravity S, which is, for example, suitable for accommodating a shaft 12. In particular, the material layer 16 is rotationally symmetrical with respect to the center of gravity S. The material layer 16 optionally comprises means for a form-fitting connection of such a shaft 12 embodied, for example, as a groove for accommodating a feather key. Otherwise, the embodiment of the material layer 16 in FIG. 2 corresponds to that in FIG. 1.

FIGS. 3A-3E show a schematic representation of a first method for producing a material layer 16 with a substantially circular opening 32. By way of example, the first embodiment of a material layer 16 from FIG. 2 is produced. The production method includes, in the step illustrated in FIG. 3C, applying 34 a first suspension 36 containing at least one binder through a circular first opening 38 in a first template 40 (depicted in FIG. 3A) onto a flat base area 42. The application 34 of the first suspension 36 is followed by a brief drying step, lasting, for example, up to 60 s, in order to fix the first suspension 36 and thus prevent smearing during subsequent steps. The drying takes place, for example, by the application of heat, in particular by means of a heat lamp.

After the application 34 of the first suspension 36 (FIG. 3C) and the brief drying of the first suspension 36, the production method includes, in the step illustrated in FIG. 3D, applying 44 a second suspension 46 containing a binder and solid particles made of a second material. The second suspension 46 is, for example, applied through a circular second opening 48 in a second template 50 (FIG. 3B), wherein the first opening 38 in the first template 40 is completely contained within the second opening 48 in the second template 50 such that the second suspension 46 completely surrounds the first suspension 36 (FIG. 3D).

The first suspension 36 acts as a placeholder material and, for example, contains binder polymers, in particular organic binder polymers. The first suspension optionally additionally contains solid particles made of a first material produced, for example, from organic polymers. Such polymers are split by thermal treatment, in particular at low temperature, for example 100° C. to 250° C., and hence can be completely removed. Alternatively, the first material in the first suspension 36 is embodied as an at least poorly sintering material, for example graphite powder, yttrium oxide, AlN, YAG or magnesium oxide, wherein the at least poorly sintering material can be evaporated by driving out the binder since no permanent cohesion of the at least poorly sintering solid particles can be formed. The solid particles in the second suspension 46 produced from the second material contain, for example, a ferromagnetic material, in particular iron or a magnetic iron alloy. The application 44 of the second suspension 46 is followed by a longer drying step, lasting, for example, up to 60 min, in order to drive out any remaining solvents, fix the suspensions 36, 46 and obtain a green body 52.

In a further step Illustrated in FIG. 3E, the green body 52 containing the suspensions 36, 46 is sintered 54 in order to obtain the material layer 16 with the substantially circular opening 32, wherein the first suspension 36 is evaporated by means of the sintering process and permanent cohesion of the solid particles in the second suspension 46 is achieved. In this context, sintering in particular includes debinding to drive out the binder and possibly further volatile components, for example of the first suspension 36, followed by the actual sintering process. Debinding takes place, for example, at a temperature of between 300° ° C. and 600° C., while the actual sintering process takes place, for example, at a temperature of 700° ° C. to 1350° C. During sintering 54, the first suspension 36 is evaporated, thus providing the substantially circular opening 32 in the material layer 16.

In particular, the second suspension 46 is applied through the second template 50 more thickly than the first suspension 36 is applied through the first template 40, wherein the second template 50 is embodied higher than the first template 40. For example, the second template 50 is higher than the first template 40 in the range of from 1% to 10%, in particular in the range of from 1% to 5%, in order to prevent the first suspension 36 from shearing-off from the flat base area 42. For example, prior to sintering 54, part of the suspensions 36, 46 is ablated, in particular parallel to the flat base area 42 on which the green body 52 rests. In particular, an upper region of the green body 52 is removed by an ablative method. The upper region is, for example, up to 20%, in particular up to 50%, of the total thickness of the green body 52. The ablative method is, for example, realized by means of hot wire cutting, also called thermal sawing, dry grinding, vibration cutting, also called vibratomy, or freeze cutting. Alternatively, the ablation of the soft elastomer-like green body 52 takes place by means of heated stepped "doctor blades" or by means of etching followed by stripping.

A plurality of, in particular identical, material layers 16 can be printed simultaneously on the base area 42 each with a template 40, 50 each of which has a plurality of in particular identical, openings 38, 48. Such an arrangement with simultaneously printed, in particular identical, material layers 16 is called multiple-up printing. In particular, each template 40, 50 has one single opening 38, 48 with a circumferential contour for each material layer 16.

FIG. 4 shows a schematic representation of a second embodiment of a material layer 16 with a substantially circular recess 32, wherein an outer contour 66 of the substantially circular recess 32 is arranged to extend equidistantly about the center of gravity S of the material layer 16. The material layer 16 is configured for a laminated rotor core 14 and produced from metallic, in particular iron-based, materials. Furthermore, by way of example, four further recesses 58 are arranged concentrically around the recess 32, wherein the further recesses 58 are, for example, configured to accommodate permanent magnets. By way of example, four non-magnetic regions 60 are arranged between the further recesses 58, likewise concentrically around the recess 32. The non-magnetic regions 60 separate the further recesses 58 from one another in order to prevent a magnetic short circuit between permanent magnets arranged in the further recesses 58. The non-magnetic regions 60 of the material layer 16 are produced from a non-magnetic metallic material, in particular a non-magnetic iron alloy, for example austenite. Otherwise, the embodiment of the material layer 16 in FIG. 4 corresponds to that in FIG. 2.

Figure 5:
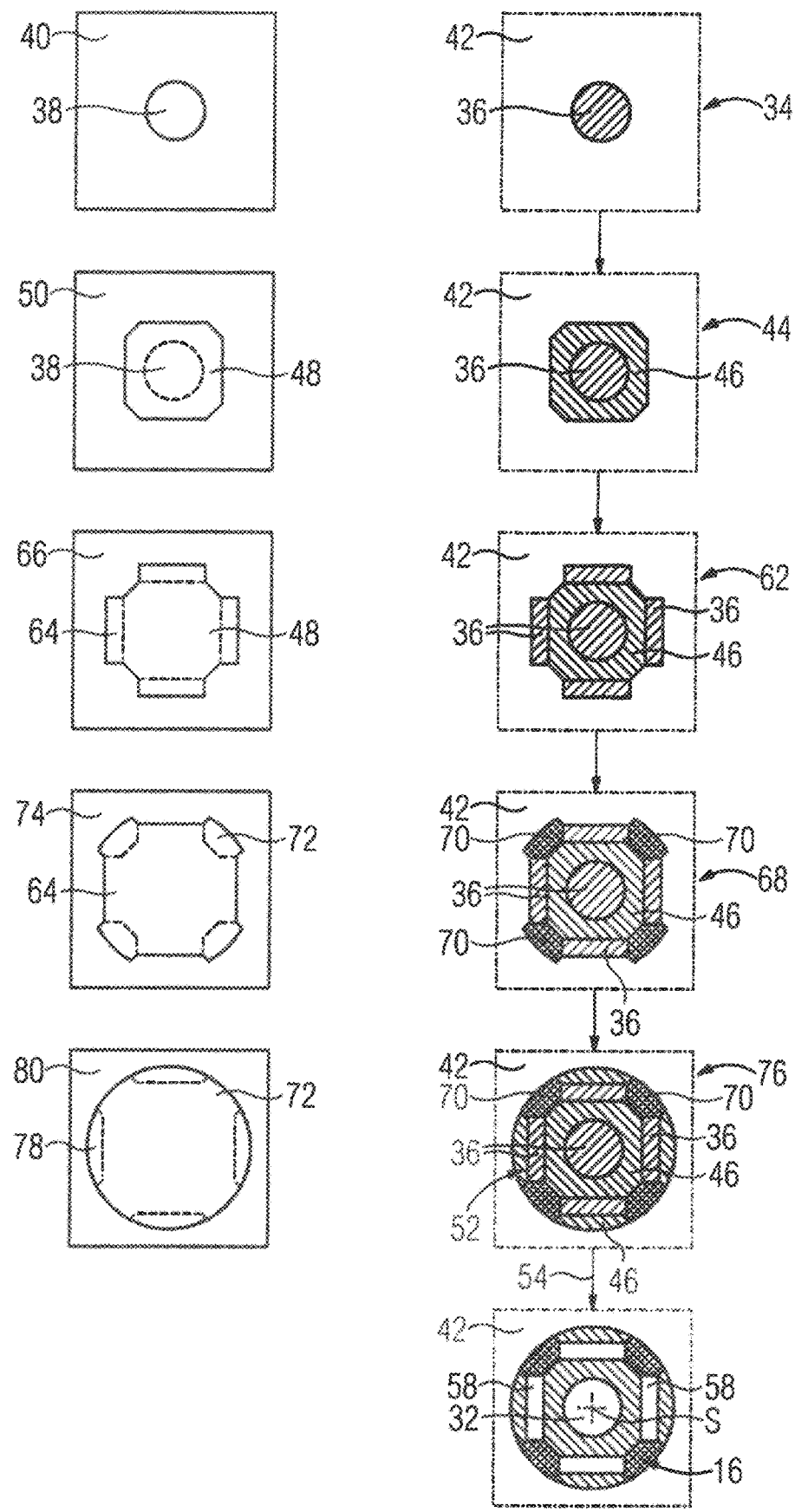

FIG. 5 shows a schematic representation of a second method for producing a material layer 16. By way of example, the second embodiment of a material layer 16 from FIG. 4 is produced. The application 34 of the first suspension 36 and the application 44 of the second suspension 46 take place analogously to the production method in FIGS. 3A-3E. After the application 44 of the second suspension 46 and a subsequent brief drying step, lasting, for example, up to 60 s, the production method in FIG. 5 includes reapplying 62 the first suspension 36. The reapplication 62 of the first suspension 36 takes place through a third opening 64 in a third template 66, wherein the second opening 48 in the second template 50 is at least partially contained within the third opening 64 in the third template 66 such that the first suspension 36 applied by means of the third template 66 at least partially surrounds the second suspension 46 applied by means of the second template 50. The third template 66 is embodied such that evaporation of the solid particles from the first material of the first suspension 36 causes the formation of further openings 58 arranged concentrically around the opening 32 which are, for example, provided to accommodate permanent magnets.

After the reapplication 62 of the first suspension 36 and a subsequent brief drying step, lasting, for example, up to 60 s, the production method in FIG. 5 includes applying 68 a third suspension 70 containing a binder and solid particles made of a third material. The application 68 of the third suspension 70 takes place through a fourth opening 72 in a fourth template 74, wherein the third material differs from the second material. In particular, the third material is a non-magnetic metallic material, in particular a non-magnetic iron alloy, for example austenite. The fourth opening 72 in the fourth template 74 is partially contained within the third opening 64 in the third template 66 such that the third suspension 70 applied by means of the fourth template 74 partially surrounds the first suspension 36 applied by means of the third template 66. In particular, the third suspension 70 applied by means of the fourth template 74 is in contact with the first suspension 36 applied by means of the third template 66 and the second suspension 46 applied by means of the second template 48.

Moreover, after the application 68 of the third suspension 70 and a subsequent brief drying step, lasting, for example, up to 60 s, the production method in FIG. 5, includes the reapplication 76 of the second suspension 46 through a fifth opening 78 in a fifth template 80. The fourth opening 72 in the fourth template 74 is partially contained within the fifth opening 78 in the fifth template 80 such that the second suspension 46 applied by means of the fifth template 80 partially surrounds the third suspension 70 applied by means of the fourth template 74. In particular, the second suspension 46 applied by means of the fifth template 80 is in contact with the third suspension 70 applied by means of the fourth template 74 and with the first suspension 36 applied by means of the third template 66. The reapplication 76 of the second suspension 46 by means of the fifth template 80 is followed by a longer drying step, lasting, for example, up to 60 min, in order to drive out remaining solvents, fix the suspensions 36, 46, 70 and obtain a green body 52.

This is followed by sintering 54 of the green body 52 containing suspensions 36, 46, 70 in order to obtain the material layer 16 described in FIG. 4, wherein the first suspension 36 is evaporated by means of the sintering process and permanent cohesion of the solid particles in the second suspension 46 and the third suspension 70 is achieved. Furthermore, the sintering process causes regions with solid particles in the second suspension 46 to be connected in a form-fitting manner to adjacent regions with solid particles in the third suspension 70. Otherwise, the embodiment of the production method in FIG. 5 corresponds to that in FIGS. 3A-3E.

Alternatively, the manufacturing method described in FIG. 6 produces a material layer 16 with further recesses 58 for accommodating bars of a squirrel-cage rotor. The application 68 of the third suspension 70 can be omitted during the production of such a material layer 16 for a squirrel-cage rotor, wherein the reapplication 76 of the second suspension 46 follows the reapplication 62 of the first suspension 36.

In summary, the invention relates to a method for producing a material layer 16 with at least one recess 32 from a green body 52. In order to achieve a better cost position compared to the prior art, it is proposed that the production method comprise the following steps: applying 34 a first suspension 36 containing at least one binder through a first opening 38 in a first template 40, applying 44 a second suspension 46 containing a binder and solid particles made of a second material through a second opening 48 in a second template 50, wherein the first opening 38 in the first template 40 is completely contained within the second opening 48 in the second template 50 such that the second suspension 46 completely surrounds the first suspension 36, sintering 54 the green body 52 containing the suspensions 36, 46, wherein, by means of the sintering process, the first suspension 36 is evaporated and permanent cohesion of the solid particles in the second suspension 46 is achieved.

The invention claimed is:

1. A method for producing a material layer with an opening from a green body, said method comprising:
applying a first suspension containing a first binder and a first material containing organic polymers through a first substantially circular opening in a first template, said first suspension operating as a placeholder material;
applying a second suspension containing a second binder and solid particles through a second opening in a second template, with the first substantially circular opening in the first template being completely contained within the second opening in the second template such that the second suspension completely surrounds the first suspension to produce a green body;
debinding the green body at a debinding temperature to drive out the first binder of the first suspension; and
sintering the green body containing the first and second suspensions at a sintering temperature above the debinding temperature such that the organic polymers of the placeholder material are evaporated to provide the opening in the material layer commensurate with the first substantially circular opening in the first template and permanent cohesion of the solid particles in the second suspension is achieved.

2. The method of claim 1, wherein the first opening of the first template is substantially circular so that the opening provided in the material layer during sintering and evaporation of the organic polymers of the placeholder material is substantially circular.

3. The method of claim 1, wherein the second suspension is applied through the second template more thickly than the first suspension is applied through the first template.

4. The method of claim 1, further comprising, prior to sintering, ablating part of the first and second suspensions parallel to a flat base area on which the green body rests.

5. The method of claim 1, wherein the solid particles of the second suspension is made of a material which contains a magnetic metallic material.

6. The method of claim 1, further comprising:
after application of the second suspension, reapplying the first suspension through a third opening in a third template, with the second opening in the second template being at least partially contained within the third opening in the third template such that the first suspension applied via the third template at least partially surrounds the second suspension applied via the second template; and
reapplying the second suspension through a fifth opening in a fifth template, with the third opening in the third template being at least partially contained within the fifth opening in the fifth template such that the second suspension applied via the fifth template at least partially surrounds the first suspension applied via the third template.

7. The method of claim 6, further comprising forming with the third template further in the material layer openings disposed concentrically around the opening formed due to the evaporation of the organic polymers of the placeholder material.

8. The method of claim 6, further comprising:
reapplying the first suspension through a fourth opening in a fourth template;
applying a third suspension containing a binder and solid particles after reapplication of the first suspension through the fourth opening in the fourth template, with the fourth opening in the fourth template being at least partially contained within the third opening in the third template such that the third suspension applied via the fourth template at least partially surrounds the first suspension applied via the third template, and with the solid particles of the third suspension being made of a material which differs from a material of the solid particles of the second suspension; and sintering the green body containing the first, second and third suspensions to achieve permanent cohesion of the solid particles in the second suspension and the third suspension and to connect regions with solid particles in the second suspension and adjacent regions with solid particles in the third suspension with a material bond.

9. The method of claim 8, wherein the material of the solid particles of the third suspension contains a non-magnetic metallic material.

10. The method of claim 1, wherein the material layer is produced with a layer thickness of between 10 μm and 300 μm.

11. The method of claim 1, further comprising applying an electrically insulating coating to at least one side of the material layer.

12. The method of claim 1, further comprising applying an electrically insulating lacquer to at least one side of the material layer.

13. A method for producing a material layer structure for a rotor or a stator of a rotating electrical machine, said method comprising:

producing a plurality of material layers, with at least one of the material layers produced by a method as set forth in claim 1; and arranging the plurality of material layers on top of one another.

14. The method of claim 5, wherein the magnetic metallic material comprises magnetic iron or a magnetic iron alloy.

15. The method of claim 9, wherein the magnetic metallic material comprises magnetic iron or a magnetic iron alloy.

16. The method of claim 10, wherein the material layer is produced with a layer thickness of between 10 μm and 100 μm.

* * * * *